(12) United States Patent
Yerramalli et al.

(10) Patent No.: US 11,683,815 B2
(45) Date of Patent: Jun. 20, 2023

(54) PIGGYBACK DOWNLINK CONTROL INFORMATION (DCI) SCHEDULING LIMIT

(71) Applicant: QUALCOMM Incorporated, San Diego, CA (US)

(72) Inventors: Srinivas Yerramalli, Hyderabad (IN); Jing Sun, San Diego, CA (US); Xiaoxia Zhang, San Diego, CA (US); Tao Luo, San Diego, CA (US); Arumugam Chendamarai Kannan, San Diego, CA (US); Qiang Wu, San Diego, CA (US); Sungwoo Park, Seoul (KR); Zhifei Fan, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 72 days.

(21) Appl. No.: 17/185,595

(22) Filed: Feb. 25, 2021

(65) Prior Publication Data
US 2021/0360675 A1 Nov. 18, 2021

Related U.S. Application Data

(60) Provisional application No. 63/025,794, filed on May 15, 2020.

(51) Int. Cl.
*H04L 5/00* (2006.01)
*H04W 72/23* (2023.01)
(Continued)

(52) U.S. Cl.
CPC .......... *H04W 72/23* (2023.01); *H04L 1/1664* (2013.01); *H04L 1/1819* (2013.01);
(Continued)

(58) Field of Classification Search
None
See application file for complete search history.

(56) References Cited

U.S. PATENT DOCUMENTS 11,096,180 B2 * 8/2021 Baldemair ............ H04W 76/27
2020/0106592 A1 4/2020 Soriaga et al.
(Continued)

FOREIGN PATENT DOCUMENTS

| EP | 3799492 A1 | 3/2021 |
| WO | 2018085429 A1 | 5/2018 |
| WO | 2019224875 A1 | 11/2019 |

OTHER PUBLICATIONS

International Search Report and Written Opinion—PCT/US2021/020048—ISA/EPO—dated Jun. 25, 2021.

*Primary Examiner* — Brandon M Renner
(74) *Attorney, Agent, or Firm* — Patterson + Sheridan, LLP

(57) ABSTRACT

Certain aspects of the present disclosure provide techniques for scheduling chain design. Certain aspects of the subject matter described in this disclosure can be implemented in a method for wireless communication. The method generally includes determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and transmitting the plurality of DCI on the plurality of data channels in accordance with the determination to a user-equipment (UE).

28 Claims, 13 Drawing Sheets

(51) Int. Cl.
*H04L 1/1607* (2023.01)
*H04L 1/1812* (2023.01)
*H04W 72/0446* (2023.01)
*H04L 1/1829* (2023.01)
*H04W 72/50* (2023.01)
*H04L 1/1867* (2023.01)

(52) U.S. Cl.
CPC .......... *H04L 1/1864* (2013.01); *H04L 5/0094* (2013.01); *H04W 72/0446* (2013.01); *H04W 72/535* (2023.01); *H04L 1/1854* (2013.01); *H04L 1/1896* (2013.01); *H04L 5/0078* (2013.01)

(56) References Cited

U.S. PATENT DOCUMENTS

| | | | | |
|---|---|---|---|---|
| 2020/0396760 | A1* | 12/2020 | Yi | H04L 1/1864 |
| 2020/0404617 | A1* | 12/2020 | Murray | H04B 7/0695 |
| 2021/0084623 | A1* | 3/2021 | Zhang | H04L 5/0094 |
| 2021/0136805 | A1* | 5/2021 | Yeo | H04L 5/0094 |
| 2022/0174704 | A1* | 6/2022 | Takano | H04W 72/02 |
| 2022/0311555 | A1* | 9/2022 | He | H04L 5/001 |
| 2022/0418029 | A1* | 12/2022 | Tirronen | H04W 72/23 |

\* cited by examiner

500 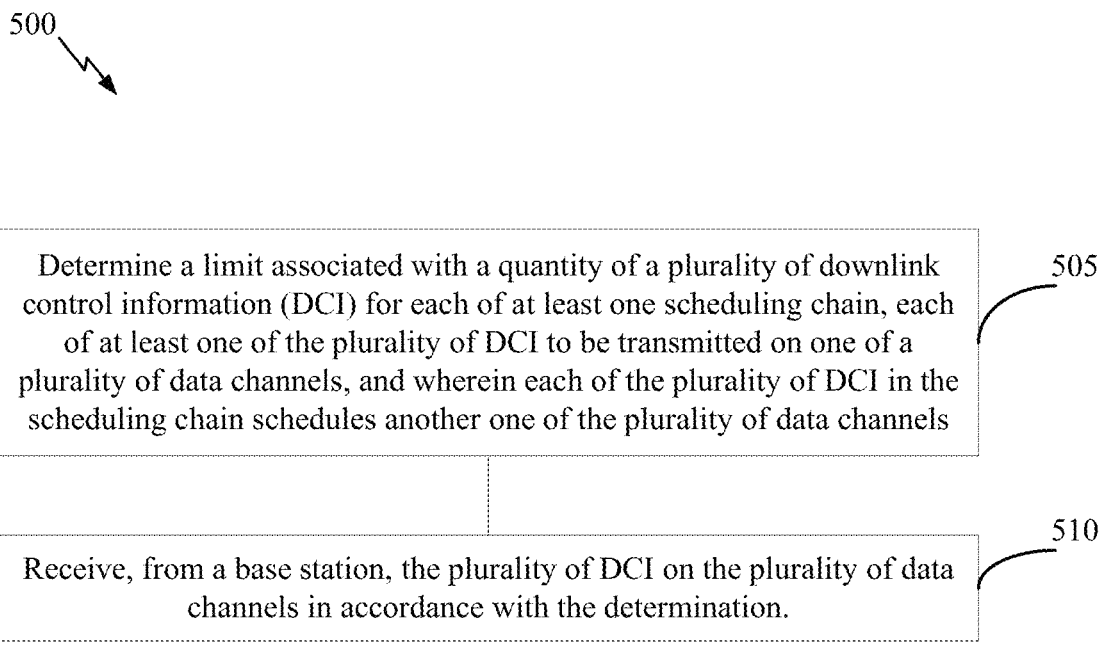

Determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels — 505

Receive, from a base station, the plurality of DCI on the plurality of data channels in accordance with the determination. — 510

FIG. 5A

Means for determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels Means for receiving, from a base station, the plurality of DCI on the plurality of data channels in accordance with the determination.

Determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels ⸺605

Transmit the plurality of DCI on the plurality of data channels in accordance with the determination to a user-equipment (UE). ⸺610

FIG. 6A

PIGGYBACK DOWNLINK CONTROL INFORMATION (DCI) SCHEDULING LIMIT

CROSS REFERENCE TO RELATED APPLICATION

This Application hereby claims priority under 35 U.S.C. § 119 to pending U.S. Provisional Patent Application No. 63/025,794, filed on May 15, 2020, the contents of which are incorporated herein in their entirety.

FIELD OF THE DISCLOSURE

Aspects of the present disclosure relate to wireless communications, and more particularly, to techniques for data channel configuration.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved scheduling chain design.

Certain aspects of the subject matter described in this disclosure can be implemented in a method for wireless communications. The method generally includes determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and transmitting the plurality of DCI on the plurality of data channels in accordance with the determination to a user-equipment (UE).

Certain aspects of the subject matter described in this disclosure can be implemented in a method for wireless communications. The method generally includes determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and receiving, from a base station, the plurality of DCI on the plurality of data channels in accordance with the determination.

Certain aspects of the subject matter described in this disclosure can be implemented in a base station. The base station generally includes means for determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and means for transmitting the plurality of DCI on the plurality of data channels in accordance with the determination to a user-equipment (UE).

Certain aspects of the subject matter described in this disclosure can be implemented in a user equipment (UE). The UE generally includes means for determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and means for receiving, from a base station, the plurality of DCI on the plurality of data channels in accordance with the determination.

Certain aspects of the subject matter described in this disclosure can be implemented in a base station. The base station generally includes a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and a transmitter configured to transmit the plurality of DCI on the plurality of data channels in accordance with the determination to a user-equipment (UE).

Certain aspects of the subject matter described in this disclosure can be implemented in a user equipment (UE). The UE generally includes a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and a receiver configured to receive, from a base station, the plurality of DCI on the plurality of data channels in accordance with the determination.

Certain aspects of the subject matter described in this disclosure can be implemented in an apparatus for wireless communications. The apparatus generally includes a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and an interface configured to output the plurality of DCI, for transmission, on the plurality of data channels in accordance with the determination.

Certain aspects of the subject matter described in this disclosure can be implemented in an apparatus for wireless communications. The apparatus generally includes a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and an interface configured to obtain, from a base station, the plurality of DCI on the plurality of data channels in accordance with the determination.

Certain aspects of the subject matter described in this disclosure can be implemented in computer-readable medium for wireless communications. The computer-readable medium generally includes instructions executable to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and receive, from a base station, the plurality of DCI on the plurality of data channels in accordance with the determination.

Certain aspects of the subject matter described in this disclosure can be implemented in computer-readable medium for wireless communications. The computer-readable medium generally includes instructions executable to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels, and transmit the plurality of DCI on the plurality of data channels in accordance with the determination.

Aspects of the present disclosure provide base stations, UEs, means for, apparatuses, processors, processing systems and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5A is a flow diagram illustrating example operations for wireless communication, in accordance with certain aspects of the present disclosure.

FIG. 5B illustrates example components capable of performing the operations shown in FIG. 5A.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
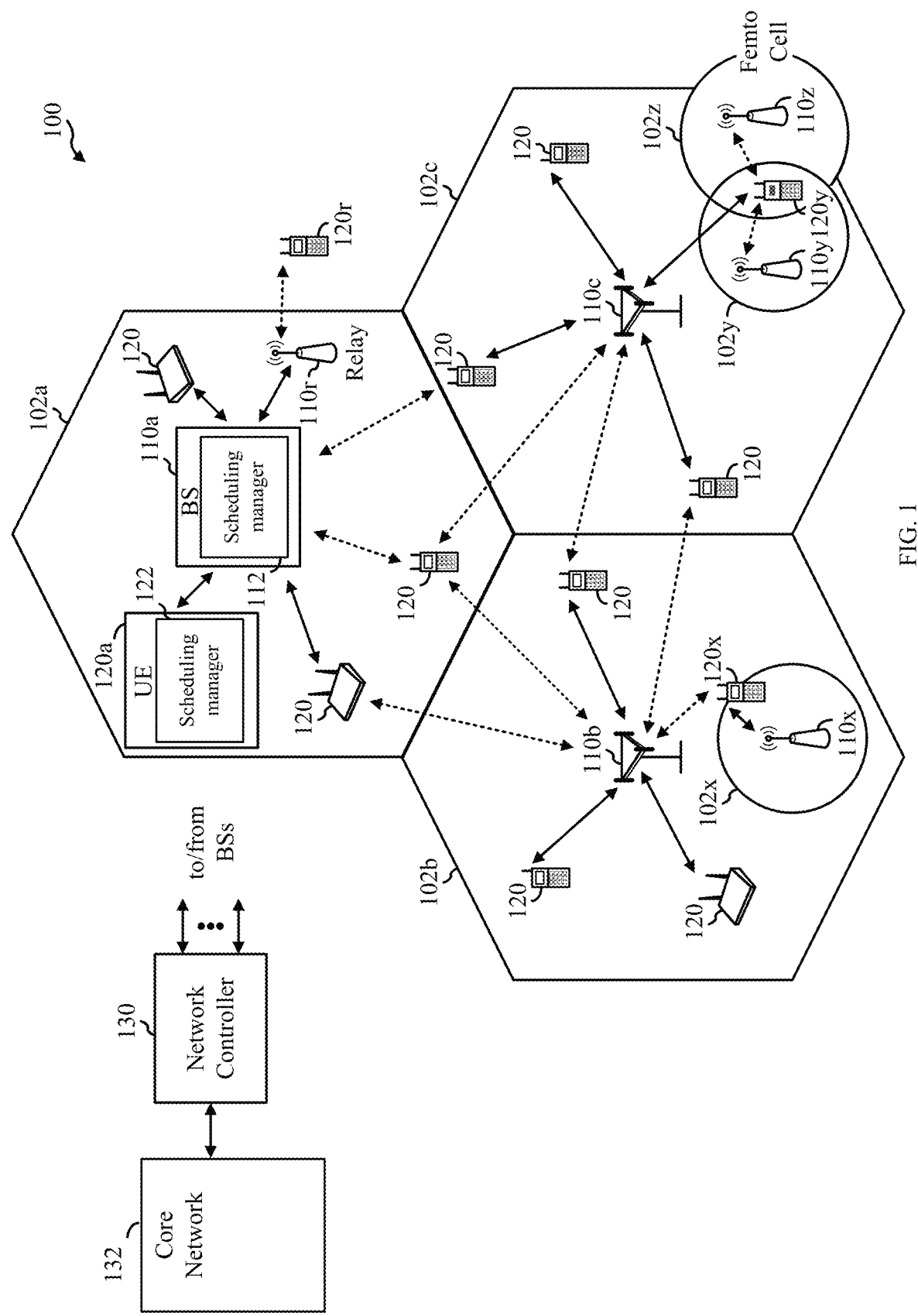
FIG. 1 is a block diagram conceptually illustrating an example telecommunications system, in accordance with certain aspects of the present disclosure.

Aspects of the present disclosure provide apparatus, methods, processing systems, and computer readable mediums for implementation of scheduling chains in accordance with certain limits to reduce error propagation.

The following description provides examples of scheduling chains in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for configuration of scheduling chains. As shown in FIG. 1, the BS 110a includes a scheduling manager 112. The scheduling manager 112 may be configured to implement scheduling chains in accordance with various limits, in accordance with aspects of the present disclosure. As shown in FIG. 1, the UE 120a includes a scheduling manager 122. The scheduling manager 122 may be configured to implement scheduling chains in accordance with various limits, in accordance with aspects of the present disclosure.

Figure 2:
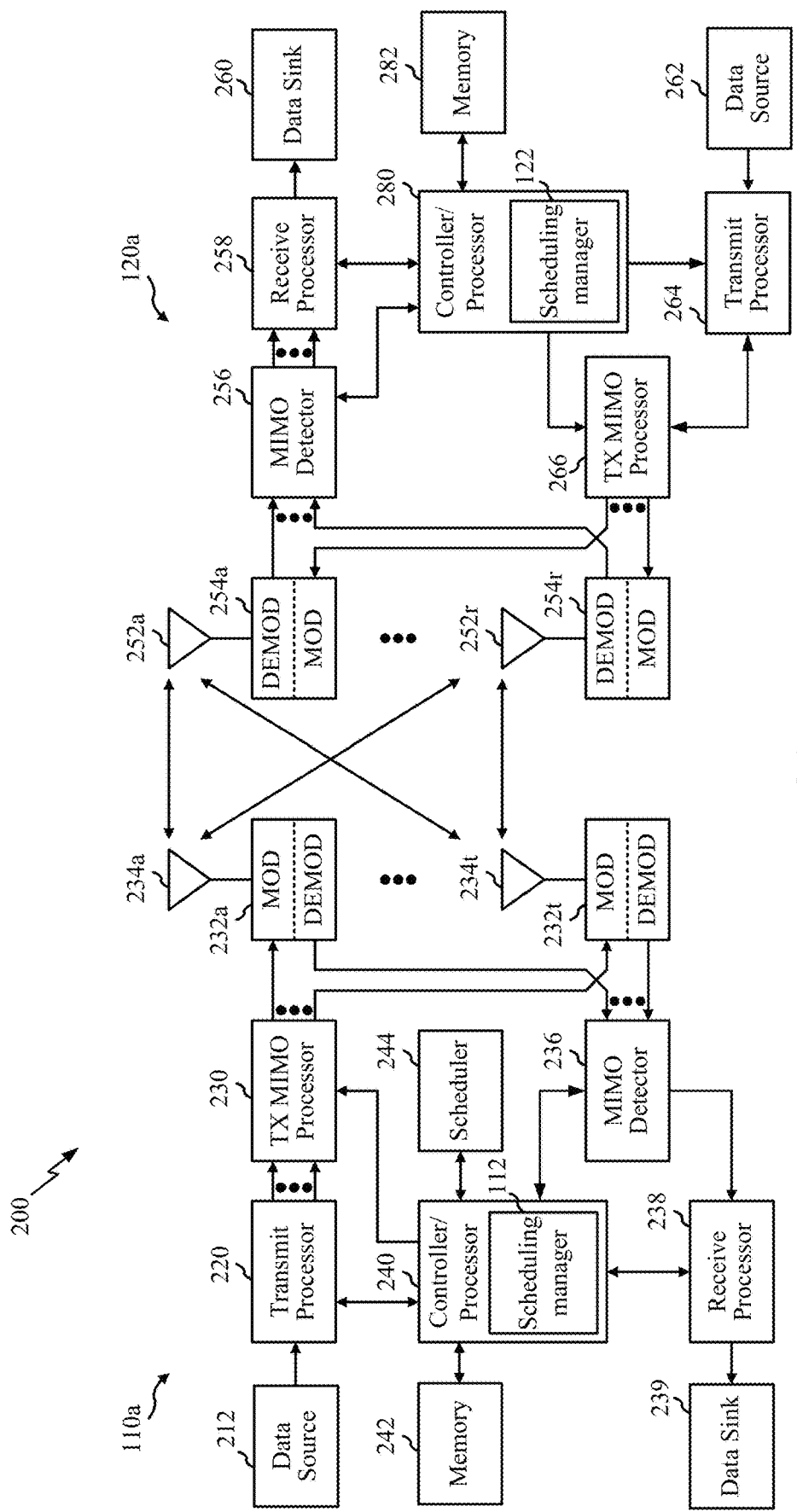
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a scheduling manager 112, according to aspects described herein. As shown in FIG. 2, the controller/processor 280 of the UE 120a has a scheduling manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
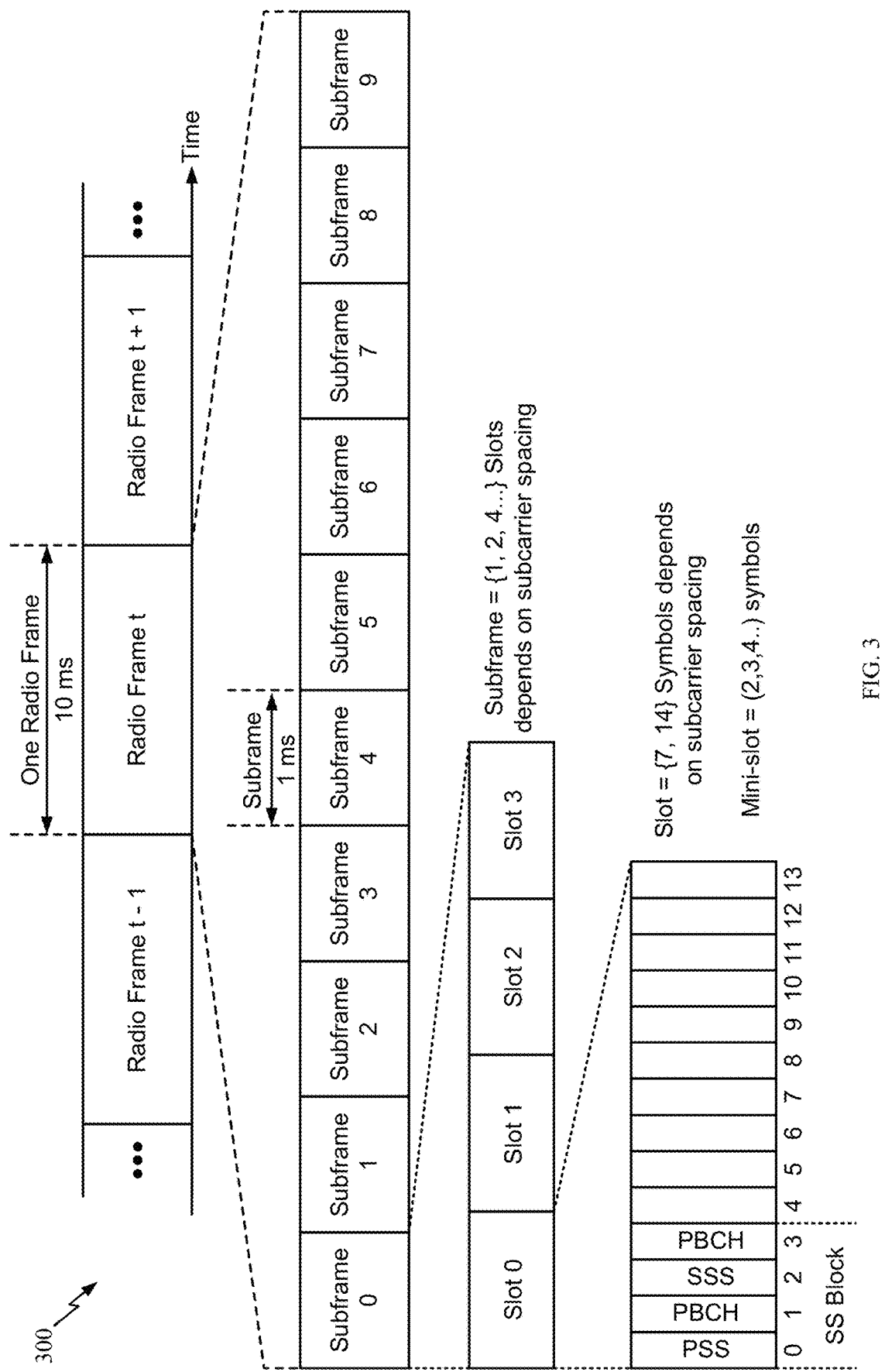
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Piggyback Downlink Control Information (DCI) Scheduling Limits

In certain implementations, downlink control information (DCI) may be communicated on a physical downlink shared channel (PDSCH) (also referred to as a data channel). Higher communication bands, such as a 60 GHz band, may have shorter slot durations as compared to lower bands, such as frequency range (FR) 1 and FR2, due to the higher subcarrier spacing (SCS) (e.g., 960 kHz, 1.92 MHz, 3.84 MHz) associated with the higher bands. Thus, the number of physical downlink control channel (PDCCH) monitoring occasions may increase, leading to high power consumption. Due to the short slot duration and narrow analog beamforming transmission on higher bands, the chance of sending multiple DCIs to different UEs is reduced as compared to FR1/FR2. Instead, it may be more likely for a BS (e.g., gNB) to send multiple DCIs to the same UE (e.g., in particular for bursty traffic). Thus, DCI may be transmitted on a data channel in order to reduce control channel monitoring density for a better micro sleep schedule at the UE, reducing power consumption. A DCI transmitted on a data channel (e.g., PDSCH) is generally referred to as a piggyback DCI (e.g., DCI piggybacked on PDSCH).

DCI piggybacking provides for a more efficient delivery of DCI, by sharing the PDSCH beam, precoding, and demodulation reference signal (DMRS). DCI piggybacking also provides for higher efficiency PDSCH transmission, with certain UEs only rate matching around the DCIs when receiving the PDSCH. In some cases, multiple piggyback DCIs may form a scheduling chain, with one piggyback DCI scheduling a data channel on which another piggyback DCI is transmitted, and so on. Certain aspects of the present disclosure are directed to techniques for providing limits scheduling chains implemented using DCI piggybacking.

Figure 4:
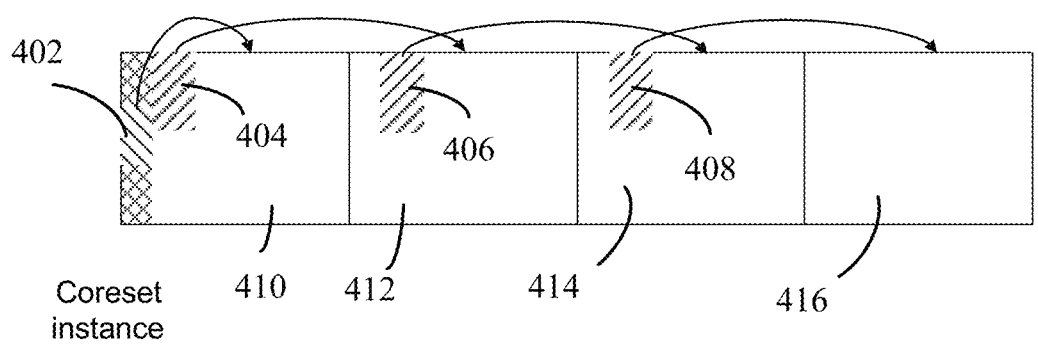
FIG. 4 illustrates piggybacked downlink control information (DCI) forming a scheduling chain, in accordance with certain aspects of the present disclosure.

FIG. 4 illustrates piggybacked DCIs forming a scheduling chain, in accordance with certain aspects of the present disclosure. As illustrated, a control resource set (CORESET) 402 may schedule resources for PDSCH 410. The PDSCH 410 may include a DCI 404 (e.g., piggyback DCI) that schedules resources for PDSCH 412. The PDSCH 412 may include a DCI 406 that schedules resources for PDSCH 414. The PDSCH 414 includes DCI 408 which schedules resources for PDSCH 416.

DCIs 404, 406, 408 are referred to as piggybacked DCIs because they are transmitted on PDSCH. DCIs 404, 406, 408 form a scheduling chain, as described herein. If a UE fails to successfully decode any DCI in the scheduling chain, the scheduling chain is broken and subsequent PDSCH transmissions and DCIs in the chain may not be received by the UE. For example, if the UE fails to decode DCI 404, the UE may be unable to receive PDSCH 412, 414, and 416. Thus, using piggyback DCIs to from a scheduling chain and schedule a large number of PDSCH transmissions sequentially may result in error propagation in case PDCCH decoding is unsuccessfully for one of the DCIs in the chain. This may especially be problematic given the bursty interference for millimeter wave (mmW) communications. Certain aspects of the present disclosure provide limits on the number of PDSCH that can be sequentially scheduled before the scheduling chain is ended, as described in more detail herein.

FIG. 5A is a flow diagram illustrating example operations 500 for wireless communication, in accordance with certain aspects of the present disclosure. The operations 500 may be performed, for example, by UE (e.g., such as a UE 120a in the wireless communication network 100).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels. At block 510, the UE may receive, from a base station, the plurality of DCI on the plurality of data channels in accordance with the determination.

Figure 6B:
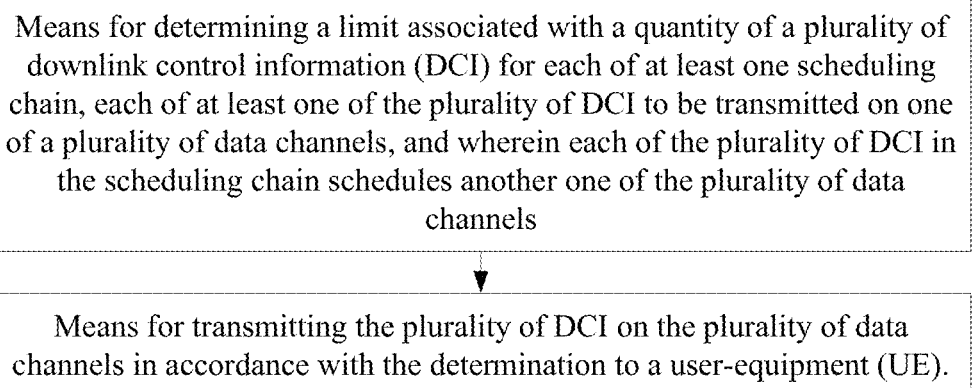
FIG. 6 is a flow diagram illustrating example operations for wireless communication, in accordance with certain aspects of the present disclosure.
FIG. 6A illustrates example components capable of performing the operations shown in FIG. 6B.

FIG. 6A is a flow diagram illustrating example operations 600 for wireless communication, in accordance with certain aspects of the present disclosure. The operations 600 may be performed, for example, by a BS (e.g., such as the BS 110a in the wireless communication network 100).

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

At block 605, the BS may determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels. At block 610, the BS may transmit the plurality of DCI on the plurality of data channels in accordance with the determination to a user-equipment (UE).

Figure 7:
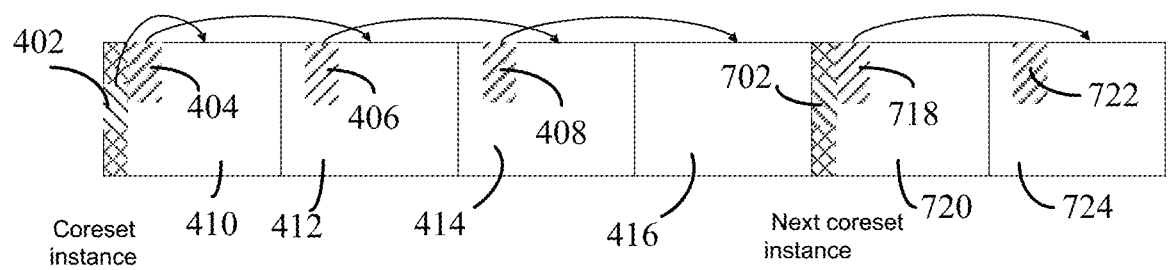
FIG. 7 illustrates a scheduling chain where a piggyback DCI may only schedule PDSCH that is transmitted before a subsequent control resource set (CORESET) occasion, in accordance with certain aspects of the present disclosure.

FIG. 7 illustrates a scheduling chain where a piggyback DCI may only schedule PDSCH that is transmitted before a subsequent CORESET occasion, in accordance with certain aspects of the present disclosure. In other words, the scheduling chain including piggybacked DCIs 404, 406, 408 begin with CORESET 402 that schedules the PDSCH 410 on which DCI 404 is transmitted. A subsequent CORESET 702 may begin another scheduling chain including DCIs 718, 722. As illustrated, DCI 718 is transmitted on PDSCH 720 and schedules PDSCH 724, where DCI 722 is transmitted on PDSCH 724.

In certain aspects, a DCI of a scheduling chain may be limited to only schedule a PDSCH that is prior to a subsequent CORESET (e.g., next CORESET instance). For example, DCIs 404, 406, 408 may be limited to only schedule a PDSCH that is prior to CORESET 702. Thus, PDSCH 416 may not include a DCI because PDSCH 416 is the last PDSCH prior to CORESET 702. Thus, the quantity of the DCIs in any particular chain may be limited by the quantity of PDSCH occasions between a CORESET instance (e.g., CORESET 402) and the next CORESET instance (CORESET 702). While FIG. 7 illustrates a DCI transmission chain being stopped at PDSCH 416 that is immediately before the next CORESET instance (e.g., CORESET 702) to facilitate understanding, the DCI transmission chain may end on any PDSCH before the next CORESET instance.

Figure 8:
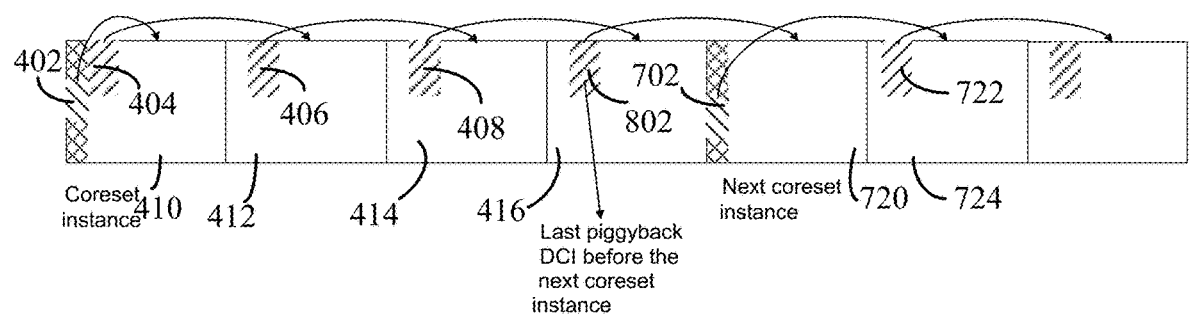
FIG. 8 illustrates a scheduling chain where the last piggyback DCI in the chain is sent before a next CORESET instance, in accordance with certain aspects of the present disclosure.

FIG. 8 illustrates a scheduling chain where the last piggyback DCI in the chain is sent before the next CORESET instance, in accordance with certain aspects of the present disclosure. In this case, the PDSCH scheduled by a DCI of a chain may potentially be beyond the next CORESET instance (e.g., CORESET 702). For example, DCI 408 may schedule resources for PDSCH 416, and PDSCH 416 may include DCI 802. DCI 802 may schedule a PDSCH that is after the next CORESET instances (e.g., CORESET 702), such as the PDSCH 720, as illustrated. However, in such a case, the PDSCH 720 may not continue the scheduling chain. In other words, the scheduling chain beginning with CORESET 402 ends with DCI 802 because DCI 802 schedules a PDSCH after the next CORESET instance.

While FIG. 8 illustrates PDSCH 416 immediately before the next CORESET instance (e.g., CORESET 702) being the last PDSCH 416 of the scheduling chain that includes a DCI, effectively ending the scheduling chain, the last PDSCH that includes a piggyback DCI for the scheduling chain may be any PDSCH prior to the next CORESET instance. Moreover, the DCI 802 may schedule any PDSCH after the next CORESET instance or any subsequent CORESET instance (e.g., any upcoming Nth CORESET instance, N being greater than 1). For unlicensed bands, the final DCI in the chain may schedule any PDSCH prior to an end of a corresponding transmission opportunity (TxOP).

Figure 9:
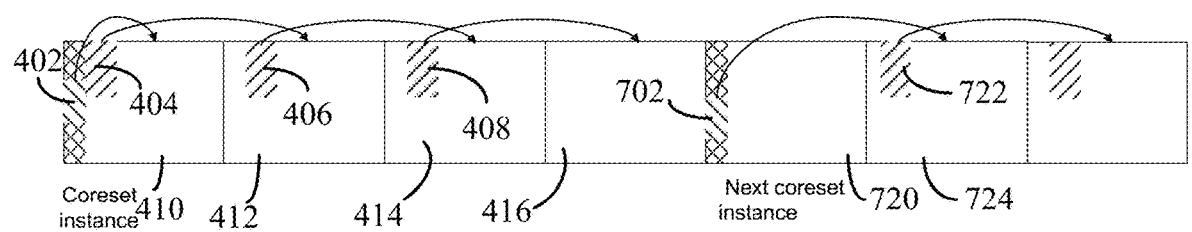
FIG. 9 illustrates a scheduling chain implemented in accordance with a configured maximum quantity of piggyback DCIs, in accordance with certain aspects of the present disclosure.

FIG. 9 illustrates a scheduling chain implemented in accordance with a configured maximum quantity of piggyback DCIs, in accordance with certain aspects of the present disclosure. For example, the BS may configure or a specification may specify the maximum number of chain DCIs. Once the limit is crossed, the UE may wait for the next CORESET instance to receive a grant. For example, as illustrated, a limit of three chain DCIs may be implemented. In other words, DCI 404 may schedule PDSCH 412, DCI 406 may schedule PDSCH 414, and DCI 408 may schedule PDSCH 416. While DCI 408 may schedule PDSCH 416, PDSCH 416 may not include another piggyback DCI because the limit for the quantity of DCIs in the chain has been reached.

Figure 10:
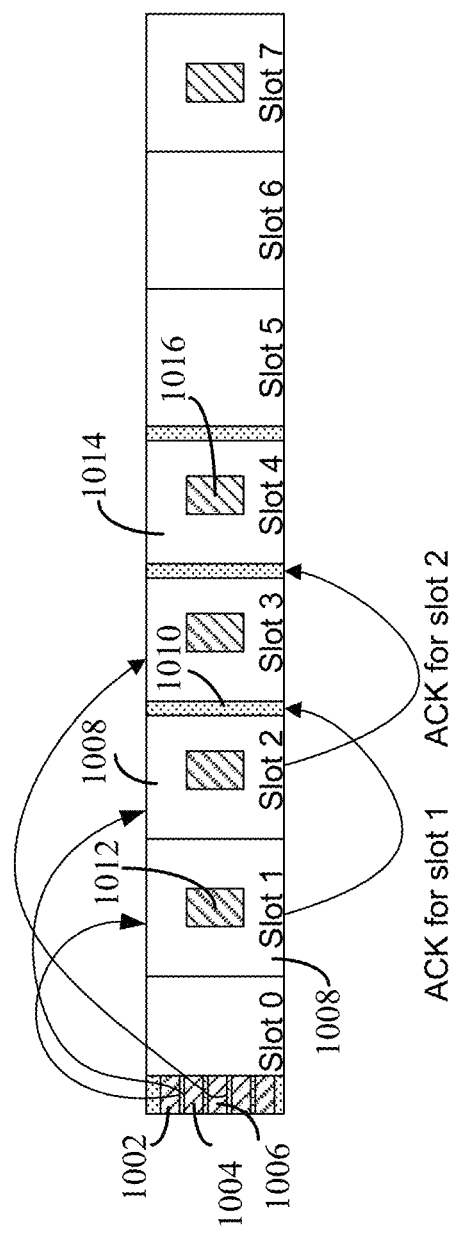
FIG. 10 illustrates multiple parallel scheduling chains, in accordance with certain aspects of the present disclosure.

FIG. 10 illustrates multiple parallel scheduling chains, in accordance with certain aspects of the present disclosure. Multiple parallel scheduling chains may be used to reduce (e.g., limit) the impact of error propagation. For example, three parallel scheduling chains may begin with respective CORESETs 1002, 1004, 1006.

As illustrated, CORESET 1002 may schedule PDSCH 1008. As illustrated, hybrid automatic request (HARD)-acknowledgement (ACK) resource 1010 may be scheduled for transmission of either an ACK or negative ACK (NACK) for PDSCH 1008 (e.g., for slot 1). If the BS receives a NACK for Slot 1 in the HARQ-ACK resource 1010 at the end of Slot 2, then the BS may estimate (e.g., assume) that the piggyback DCI 1012 (e.g., PDCCH) in slot 1 will not be decoded. The piggyback DCI 1012 may schedule resources for Slot 4. Thus, because the BS assumes that the piggyback DCI 1012 is not decoded, the BS may also assume that PDSCH and piggyback DCI (e.g., PDCCH) that would be present in Slot 4 will also not be decoded. Therefore, the BS may determine to end the scheduling chain by forgoing inclusion of a DCI in slot 3 that continues the chain.

To facilitate such decision making by the BS, the next PDSCH in a scheduling may be scheduled after K0+K1+K3 slots, K0 indicating the number of slots from PDCCH (e.g. CORESET 1002) to PDSCH (e.g., PDSCH 1008), K1 indicating the number of slots from PDSCH (e.g., PDSCH 1008) to ACK (e.g., HARQ-ACK resource 1010), and K3 indicating the number of slots from ACK (e.g., HARQ-ACK resource 1010) to the next PDCCH (e.g., in slot 4). In the example given with respect to FIG. 10, K1, K2, and K3 are each equal to 1 as there is one slot between CORESET 1002 and slot 2 (e.g., the scheduled PDSCH 1008), one slot between slot 2 and HARQ-ACK resource 1010, and one slot between HARQ-ACK resource 1010 and slot 4. In this manner, the error propagation for each chain may be limited to a single slot.

In some cases, the UE may fail PDSCH decoding in Slot 1 but decode the DCI 1012 that schedules a PDSCH in slot 4. Thus, the UE may be expecting a PDSCH and potentially a piggyback PDCCH in slot 4. In certain aspects of the present disclosure, the BS may transmit the PDSCH 1014 in slot 4 and send a null piggyback PDCCH 1016 (e.g., a null DCI) in slot 4, but terminate the chain. In other words, the null PDCCH may be a PDCCH that does not schedule any other transmissions.

In some cases, the UE may fail PDSCH decoding for slot 1 and also fail piggyback DCI decoding in slot 1. Thus, the UE may not expect a PDSCH in slot 4. Thus, in certain aspects of the present disclosure, the BS may skip the full transmission in slot 4 as the BS assumes that the UE will not decode PDSCH and PDCCH that would otherwise be included in slot 4.

In certain aspects, the HARQ-ACK resource 1010 may indicate an ACK or NACK for PDSCH in slot 2, and indicate an ACK or NACK for PDCCH in slot 2. Thus, the BS may determine whether the UE has failed to decode the PDSCH and PDCCH in slot 2, or only fails to decode the PDSCH in slot 2 and has successfully decoded the PDCCH in slot 2. Accordingly, the BS may determine whether to transmit a null piggyback PDCCH in slot 4, or fully forgo the transmission in slot 4 to the UE.

Certain aspects of the present disclosure are directed to techniques starting a scheduling chain when another chain is terminated. For example, in certain aspects, a scheduling chain may be started by scheduling a piggyback PDCCH from other ongoing chains (e.g., chains starting with CORESETs 1004, 1006). In certain aspects, a piggyback PDCCH may be used to dynamically trigger the UE to monitor a new search space location. For example, a new CORESET search space may be configured in response to a scheduling chain being terminated. That is, if a NACK is received in the HARQ-ACK resource 1010, the scheduling chain starting with CORESET 1002 may be terminated. In this case, a new CORESET may be scheduled that begins a new scheduling chain. For example, the new CORESET in a slot may be indicated in a DCI in slot 5.

In certain aspects, a configuration for a new scheduling chain may be pre-configured at the UE. The location of the configured schedule chain may be specified in a triggering piggyback DCI. In some cases, a search space may already be scheduled for the UE to start a new scheduling chain. Generally, it is preferable to use piggybacked grants for long durations. A PDCCH search space (e.g., CORESET) may be used to start a new scheduling chain if necessary.

Figure 11:
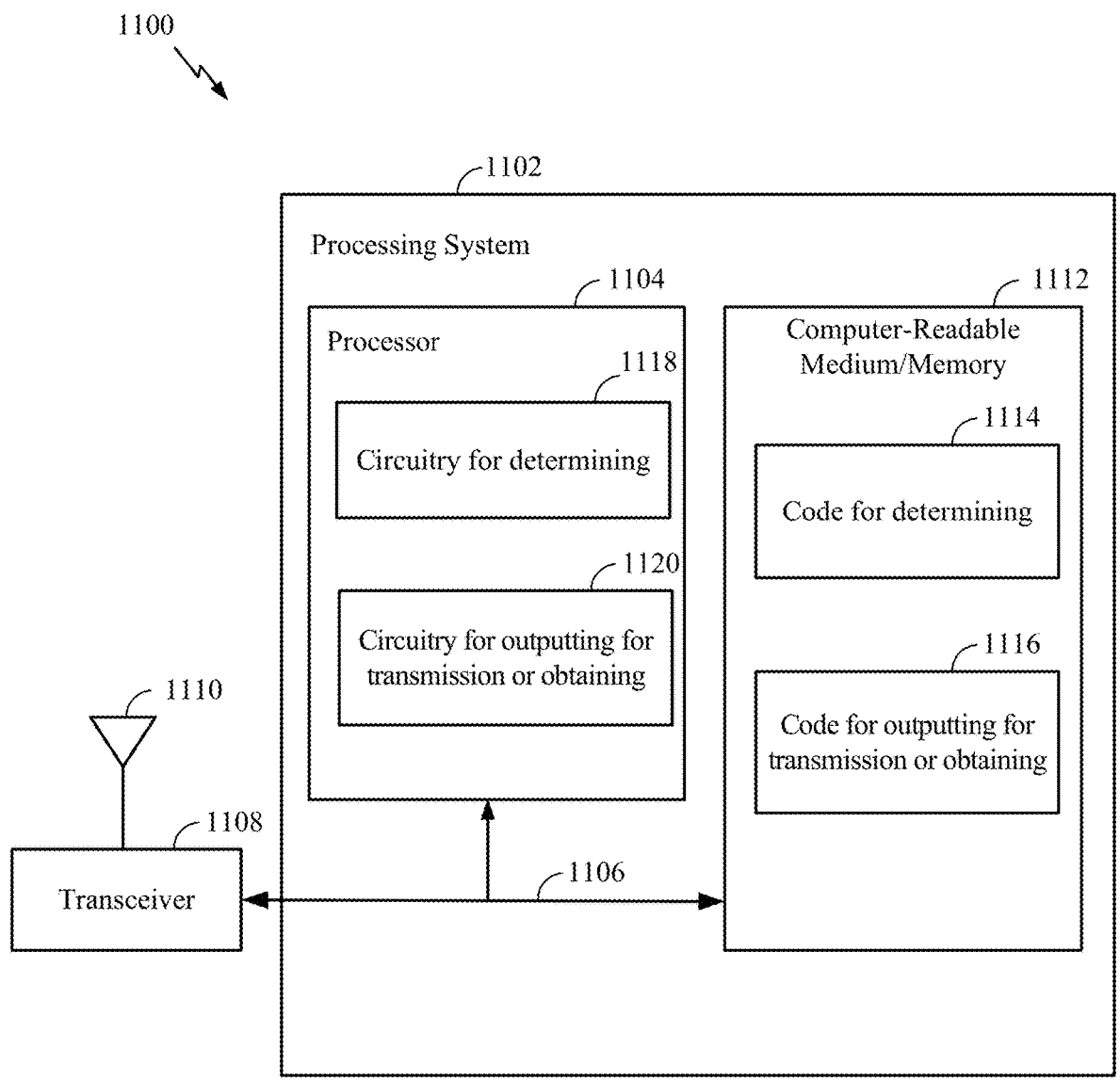
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 4-5. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 4-5, or other operations for performing the various techniques discussed herein for implementation of scheduling chains. In certain aspects, computer-readable medium/memory 1112 stores code 1114 for determining; and code 1116 for outputting for transmission or obtaining. In certain aspects, the processor 1104 has circuitry configured to implement the code stored in the computer-readable medium/memory 1112. The processor 1104 includes circuitry 1118 for determining; and circuitry 1120 for outputting for transmission or obtaining.

In addition to the various aspects described above, aspects of specific combinations are within the scope of the disclosure, some of which are detailed below:

Aspect 1: A method for wireless communications, comprising: determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and transmitting the plurality of DCI on the plurality of data channels in accordance with the determination to a user-equipment (UE).

Aspect 2: The method of Aspect 1, further comprising transmitting, to the UE, a control resource set (CORESET) scheduling one of the data channels having an initial DCI of the scheduling chain, and wherein determining the limit comprises determining that a final DCI in the scheduling chain schedules another data channel that is in a slot prior to a following CORESET to be transmitted to the UE.

Aspect 3: The method of any one of Aspects 1-2, further comprising transmitting, to the UE, a CORESET scheduling one of the plurality of data channels having an initial DCI of the scheduling chain, and wherein determining the limit comprises determining that a final DCI in the scheduling chain that schedules is in a slot prior to a following CORESET to be transmitted to the UE, the final DCI scheduling another data channel to be transmitted.

Aspect 4: The method of Aspect 3, further comprising transmitting the following CORESET, and transmitting the other data channel after the following CORESET.

Aspect 5: The method of any one of Aspects 1-4, wherein determining the limit comprises determining a limit of the quantity of the plurality of DCI forming the scheduling chain.

Aspect 6: The method of any one of Aspects 1-5, wherein the at least one scheduling chain comprises multiple scheduling chains.

Aspect 7: The method of Aspect 6, wherein the multiple scheduling chains are initiated using multiple CORESETs in a slot.

Aspect 8: The method of any one of Aspects 1-7, further comprising receiving hybrid automatic repeat request (HARQ) indication associated with one of the data channels having a DCI of the plurality of DCI, wherein determining the limit is based on the HARQ indication.

Aspect 9: The method of Aspect 8, wherein the DCI schedules a data channel transmission in a slot, and wherein determining the limit comprises determining to skip the transmission in the slot if the DCI is not decoded successfully by the UE.

Aspect 10: The method of Aspect 8, wherein the DCI schedules a data channel transmission in a slot, and wherein determining the limit comprises deciding to transmit a null DCI in the slot if the DCI is decoded successfully and the data channel on which the DCI is transmitted is not decoded successfully, the method further comprising transmitting the null DCI in accordance with the decision.

Aspect 11: The method of Aspect 8, wherein determining the limit based on the HARQ indication comprises determining to terminate the corresponding scheduling chain based on the HARQ indication, the method further comprising transmitting another DCI indicating on another data channel indicating a search space for initiating another scheduling chain.

Aspect 12: The method of Aspect 11, further comprising transmitting a CORESET via the search space, the CORESET scheduling a data channel for the other scheduling chain.

Aspect 13: A method for wireless communications by a user-equipment (UE), comprising: determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and receiving, from a base station, the plurality of DCI on the plurality of data channels in accordance with the determination.

Aspect 14: The method of Aspect 13, further comprising receiving a control resource set (CORESET) scheduling one of the data channels having an initial DCI of the scheduling chain, and wherein determining the limit comprises determining that a final DCI in the scheduling chain schedules another data channel that is in a slot prior to a following CORESET to be transmitted to the UE.

Aspect 15: The method of any one of Aspects 13-14, further comprising receiving a CORESET scheduling one of the plurality of data channels having an initial DCI of the scheduling chain, and wherein determining the limit comprises determining that a final DCI in the scheduling chain that schedules is in a slot prior to a following CORESET to be transmitted to the UE, the final DCI scheduling another data channel to be transmitted.

Aspect 16: The method of Aspect 15, further comprising receiving the following CORESET, and receiving the other data channel after the following CORESET.

Aspect 17: The method of any one of Aspects 13-16, wherein determining the limit comprises determining a limit of the quantity of the plurality of DCI forming the scheduling chain.

Aspect 18: The method of any one of Aspects 13-17, wherein the at least one scheduling chain comprises multiple scheduling chains.

Aspect 19: The method of Aspect 18, wherein the multiple scheduling chains are initiated using multiple CORESETs in a slot.

Aspect 20: The method of any one of Aspects 13-19, further comprising transmitting hybrid automatic repeat request (HARQ) indication associated with one of the data channels having a DCI of the plurality of DCI.

Aspect 21: The method of Aspect 20, wherein the DCI schedules a data channel reception in a slot, and wherein the reception in the slot is skipped if the DCI is not decoded successfully by the UE.

Aspect 22: The method of Aspect 20, wherein the DCI schedules a data channel reception in a slot, and wherein the method further comprises receiving a null DCI in the slot if the DCI is decoded successfully and the data channel on which the DCI is transmitted is not decoded successfully.

Aspect 23: The method of Aspect 20, further comprising receiving another DCI on another data channel indicating a search space for initiating another scheduling chain after transmitting the HARQ indication.

Aspect 24: The method of Aspect 23, further comprising receiving a CORESET via the search space, the CORESET scheduling a data channel for the other scheduling chain.

Aspect 25: A base station, comprising: means for determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and means for transmitting the plurality of DCI on the plurality of data channels in accordance with the determination to a user-equipment (UE).

Aspect 26: The base station of Aspect 25, further comprising means for transmitting, to the UE, a control resource set (CORESET) scheduling one of the data channels having an initial DCI of the scheduling chain, and wherein the means for determining the limit comprises means for determining that a final DCI in the scheduling chain schedules another data channel that is in a slot prior to a following CORESET to be transmitted to the UE.

Aspect 27: The base station of any one of Aspects 25-26, further comprising means for transmitting, to the UE, a CORESET scheduling one of the plurality of data channels having an initial DCI of the scheduling chain, and wherein the means for determining the limit comprises means for determining that a final DCI in the scheduling chain that schedules is in a slot prior to a following CORESET to be transmitted to the UE, the final DCI scheduling another data channel to be transmitted.

Aspect 28: The base station of Aspect 27, further comprising means for transmitting the following CORESET, and means for transmitting the other data channel after the following CORESET.

Aspect 29: The base station of any one of Aspects 25-28, wherein the means for determining the limit comprises means for determining a limit of the quantity of the plurality of DCI forming the scheduling chain.

Aspect 30: The base station of any one of Aspects 25-29, wherein the at least one scheduling chain comprises multiple scheduling chains.

Aspect 31: The base station of Aspect 30, wherein the multiple scheduling chains are initiated using multiple CORESETs in a slot.

Aspect 32: The base station of any one of Aspects 25-31, further comprising means for receiving hybrid automatic repeat request (HARQ) indication associated with one of the data channels having a DCI of the plurality of DCI, wherein the means for determining the limit comprises means for determining the limit based on the HARQ indication.

Aspect 33: The base station of Aspect 32, wherein the DCI schedules a data channel transmission in a slot, and wherein the means for determining the limit comprises means for determining to skip the transmission in the slot if the DCI is not decoded successfully by the UE.

Aspect 34: The base station of Aspect 32, wherein the DCI schedules a data channel transmission in a slot, and wherein the means for determining the limit comprises means for deciding to transmit a null DCI in the slot if the DCI is decoded successfully and the data channel on which the DCI is transmitted is not decoded successfully, the base station further comprising means for transmitting the null DCI in accordance with the decision.

Aspect 35: The base station of Aspect 32, wherein the means for determining the limit based on the HARQ indication comprises means for determining to terminate the corresponding scheduling chain based on the HARQ indication, the base station further comprising means for transmitting another DCI indicating on another data channel indicating a search space for initiating another scheduling chain.

Aspect 36: The base station of Aspect 35, further comprising means for transmitting a CORESET via the search space, the CORESET scheduling a data channel for the other scheduling chain.

Aspect 37: A user-equipment (UE), comprising: means for determining a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and means for receiving, from a base station, the plurality of DCI on the plurality of data channels in accordance with the determination.

Aspect 38: The UE of Aspect 37, further comprising means for receiving a control resource set (CORESET) scheduling one of the data channels having an initial DCI of the scheduling chain, and wherein the means for determining the limit comprises means for determining that a final DCI in the scheduling chain schedules another data channel that is in a slot prior to a following CORESET to be transmitted to the UE.

Aspect 39: The UE of any one of Aspects 37-38, further comprising means for receiving a CORESET scheduling one of the plurality of data channels having an initial DCI of the scheduling chain, and wherein the means for determining the limit comprises means for determining that a final DCI in the scheduling chain that schedules is in a slot prior to a following CORESET to be transmitted to the UE, the final DCI scheduling another data channel to be transmitted.

Aspect 40: The UE of Aspect 39, further comprising means for receiving the following CORESET and means for receiving the other data channel after the following CORESET.

Aspect 41: The UE of any one of Aspects 37-40, wherein the means for determining the limit comprises means for determining a limit of the quantity of the plurality of DCI forming the scheduling chain.

Aspect 42: The UE of any one of Aspects 37-41, wherein the at least one scheduling chain comprises multiple scheduling chains.

Aspect 43: The UE of Aspect 42, wherein the multiple scheduling chains are initiated using multiple CORESETs in a slot.

Aspect 44: The UE of any one of Aspects 37-43, further comprising means for transmitting hybrid automatic repeat request (HARQ) indication associated with one of the data channels having a DCI of the plurality of DCI.

Aspect 45: The UE of Aspect 44, wherein the DCI schedules a data channel reception in a slot, and wherein the reception in the slot is skipped if the DCI is not decoded successfully by the UE.

Aspect 46: The UE of Aspect 44, wherein the DCI schedules a data channel reception in a slot, and wherein the UE further comprises means for receiving a null DCI in the slot if the DCI is decoded successfully and the data channel on which the DCI is transmitted is not decoded successfully.

Aspect 47: The UE of Aspect 44, further comprising means for receiving another DCI on another data channel indicating a search space for initiating another scheduling chain after transmitting the HARQ indication.

Aspect 48: The UE of Aspect 47, further comprising means for receiving a CORESET via the search space, the CORESET scheduling a data channel for the other scheduling chain.

Aspect 49: A base station, comprising: a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and a transmitter configured to transmit the plurality of DCI on the plurality of data channels in accordance with the determination to a user-equipment (UE).

Aspect 50: The base station of Aspect 49, wherein the transmitter is further configure to transmit, to the UE, a control resource set (CORESET) scheduling one of the data channels having an initial DCI of the scheduling chain, and wherein the determination of the limit comprises determining that a final DCI in the scheduling chain schedules another data channel that is in a slot prior to a following CORESET to be transmitted to the UE.

Aspect 51: The base station of any one of Aspects 49-50, wherein the transmitter is further configure to transmit, to the UE, a CORESET scheduling one of the plurality of data channels having an initial DCI of the scheduling chain, and wherein the determination of the limit comprises determining that a final DCI in the scheduling chain that schedules is in a slot prior to a following CORESET to be transmitted to the UE, the final DCI scheduling another data channel to be transmitted.

Aspect 52: The base station of Aspect 51, wherein the transmitter is further configure to transmit the following CORESET, and transmitting the other data channel after the following CORESET.

Aspect 53: The base station of any one of Aspects 49-52, wherein the determination of the limit comprises determining a limit of the quantity of the plurality of DCI forming the scheduling chain.

Aspect 54: The base station of any one of Aspects 49-53, wherein the at least one scheduling chain comprises multiple scheduling chains.

Aspect 55. The base station of Aspect 54, wherein the multiple scheduling chains are initiated using multiple CORESETs in a slot.

Aspect 56: The base station of any one of Aspects 49-55, further comprising a receiver configured to receive hybrid automatic repeat request (HARQ) indication associated with one of the data channels having a DCI of the plurality of DCI, wherein the determination of the limit comprises determining the limit based on the HARQ indication.

Aspect 57: The base station of Aspect 56, wherein the DCI schedules a data channel transmission in a slot, and wherein the determination of the limit comprises determining to skip the transmission in the slot if the DCI is not decoded successfully by the UE.

Aspect 58: The base station of Aspect 56, wherein the DCI schedules a data channel transmission in a slot, wherein the determination of the limit comprises deciding to transmit a null DCI in the slot if the DCI is decoded successfully and the data channel on which the DCI is transmitted is not decoded successfully, and wherein the transmitter is further configured to transmit the null DCI in accordance with the decision.

Aspect 59: The base station of Aspect 56, wherein the determination of the limit based on the HARQ indication comprises determining to terminate the corresponding scheduling chain based on the HARQ indication, and wherein the transmitter is further configured to transmit another DCI indicating on another data channel indicating a search space for initiating another scheduling chain.

Aspect 60: The base station of Aspect 59, wherein the transmitter is further configure to transmit a CORESET via the search space, the CORESET scheduling a data channel for the other scheduling chain.

Aspect 61: A user-equipment (UE), comprising: a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and a receiver configured to receive, from a base station, the plurality of DCI on the plurality of data channels in accordance with the determination.

Aspect 62: The UE of Aspect 61, wherein the receiver is further configure to receive a control resource set (CORESET) scheduling one of the data channels having an initial DCI of the scheduling chain, and wherein the determination of the limit comprises determining that a final DCI in the scheduling chain schedules another data channel that is in a slot prior to a following CORESET to be transmitted to the UE.

Aspect 63: The UE of any one of Aspects 61-62, wherein the receiver is further configure to receive a CORESET scheduling one of the plurality of data channels having an initial DCI of the scheduling chain, and wherein the determination of the limit comprises determining that a final DCI in the scheduling chain that schedules is in a slot prior to a following CORESET to be transmitted to the UE, the final DCI scheduling another data channel to be transmitted.

Aspect 64: The UE of Aspect 63, wherein the receiver is further configure to receive the following CORESET and receive the other data channel after the following CORESET.

Aspect 65: The UE of any one of Aspects 61-64, wherein the determination of the limit comprises determining a limit of the quantity of the plurality of DCI forming the scheduling chain.

Aspect 66: The UE of any one of Aspects 61-65, wherein the at least one scheduling chain comprises multiple scheduling chains.

Aspect 67: The UE of Aspect 66, wherein the multiple scheduling chains are initiated using multiple CORESETs in a slot.

Aspect 68: The UE of any one of Aspects 61-67, further comprising a transmitter configured to transmit a hybrid automatic repeat request (HARQ) indication associated with one of the data channels having a DCI of the plurality of DCI.

Aspect 69: The UE of Aspect 68, wherein the DCI schedules a data channel reception in a slot, and wherein the reception in the slot is skipped if the DCI is not decoded successfully by the UE.

Aspect 70: The UE of Aspect 68, wherein the DCI schedules a data channel reception in a slot, and wherein the receive is further configured to receive a null DCI in the slot if the DCI is decoded successfully and the data channel on which the DCI is transmitted is not decoded successfully.

Aspect 71: The UE of Aspect 68, wherein the receiver is further configure to receive another DCI on another data channel indicating a search space for initiating another scheduling chain after transmitting the HARQ indication.

Aspect 72: The UE of Aspect 71, wherein the receiver is further configure to receive a CORESET via the search space, the CORESET scheduling a data channel for the other scheduling chain.

Aspect 73: An apparatus for wireless communications, comprising: a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and an interface configured to output the plurality of DCI, for transmission, on the plurality of data channels in accordance with the determination.

Aspect 74: An apparatus for wireless communications, comprising: a processing system configured to determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and an interface configured to obtain, from a base station, the plurality of DCI on the plurality of data channels in accordance with the determination.

Aspect 75: A computer-readable medium for wireless communications, comprising instructions executable to: determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and transmit the plurality of DCI on the plurality of data channels in accordance with the determination.

Aspect 76: A computer-readable medium for wireless communications, comprising instructions executable to: determine a limit associated with a quantity of a plurality of downlink control information (DCI) for each of at least one scheduling chain, each of at least one of the plurality of DCI to be transmitted on one of a plurality of data channels, and wherein each of the plurality of DCI in the scheduling chain schedules another one of the plurality of data channels; and receive, from a base station, the plurality of DCI on the plurality of data channels in accordance with the determination.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

The invention claimed is:

1. A method for wireless communications, comprising:
determining, for at least a first scheduling chain, a limit associated with a plurality of data channels that contain downlink control information (DCI), wherein the DCI contained in at least one of the plurality of data channels schedules another one of the plurality of data channels that contain DCI; and
transmitting the DCI in the plurality of data channels to a user-equipment (UE), in accordance with the limit.

2. The method of claim 1, further comprising transmitting, to the UE in a control resource set (CORESET), DCI scheduling one of the data channels containing an initial DCI of the first scheduling chain, and wherein determining the limit comprises determining that a final DCI in the first scheduling chain schedules another data channel that is in a slot prior to a following CORESET.

3. The method of claim 1, further comprising transmitting, to the UE in a control resource set (CORESET), DCI scheduling one of the plurality of data channels containing an initial DCI of the first scheduling chain, and wherein determining the limit comprises determining that a final DCI in the first scheduling chain is in a slot prior to a following CORESET, the final DCI scheduling another data channel to be transmitted.

4. The method of claim 3, further comprising transmitting the other data channel after the following CORESET.

5. The method of claim 1, wherein determining the limit comprises determining a limit of a quantity of the plurality of data channels that contain DCI forming the first scheduling chain.

6. The method of claim 1, wherein the at least a first scheduling chain comprises multiple scheduling chains.

7. The method of claim 1, further comprising receiving a hybrid automatic repeat request (HARQ) indication associated with one of the data channels having a DCI of the plurality of data channels that contain DCI, wherein determining the limit is based on the HARQ indication.

8. The method of claim 7, wherein:
the DCI schedules a data channel transmission in a slot; and
the method further comprises skipping the transmission in the slot if the DCI is not decoded successfully by the UE.

9. The method of claim 7, wherein:
the DCI schedules a data channel transmission in a slot; and
the method further comprises transmitting a null DCI in the slot if the DCI is decoded successfully and the data channel on which the DCI is transmitted is not decoded successfully.

10. The method of claim 7, wherein:
determining the limit based on the HARQ indication comprises determining to terminate a corresponding scheduling chain based on the HARQ indication; and
the method further comprising transmitting another DCI on another data channel indicating a search space for initiating another scheduling chain.

11. The method of claim 10, further comprising transmitting signaling in the search space scheduling a data channel for the other scheduling chain.

12. A method for wireless communications by a user-equipment (UE), comprising:
determining, for at least a first scheduling chain, a limit associated with a plurality of data channels that contain downlink control information (DCI), wherein the DCI contained in at least one of the plurality of data channels schedules another one of the plurality of data channels that contain DCI; and
receiving, from a base station, the DCI in the plurality of data channels in accordance with the limit.

13. The method of claim 12, further comprising receiving, in a control resource set (CORESET), DCI scheduling one of the data channels containing an initial DCI of the first scheduling chain, and wherein determining the limit comprises determining that a final DCI in the first scheduling chain schedules another data channel that is in a slot prior to a following CORESET.

14. The method of claim 12, further comprising receiving in a control resource set (CORESET), DCI scheduling one of the plurality of data channels containing an initial DCI of the first scheduling chain, and wherein determining the limit comprises determining that a final DCI in the first scheduling chain is in a slot prior to a following CORESET, the final DCI scheduling another data channel to be transmitted.

15. The method of claim 14, further comprising receiving the other data channel after the following CORESET.

16. The method of claim 12, wherein determining the limit comprises determining a limit of a quantity of the plurality of data channels that contain DCI forming the first scheduling chain.

17. The method of claim 12, wherein the at least a first scheduling chain comprises multiple scheduling chains.

18. The method of claim 12, further comprising transmitting a hybrid automatic repeat request (HARD) indication associated with one of the data channels having a DCI of the plurality of data channels that contain DCI.

19. The method of claim 18, wherein:
the DCI schedules a data channel reception in a slot; and
the method further comprises skipping reception in the slot if the DCI is not decoded successfully by the UE.

20. The method of claim 18, wherein:
the DCI schedules a data channel transmission in a slot; and
the method further comprises receiving a null DCI in the slot if the DCI is decoded successfully and the data channel on which the DCI is transmitted is not decoded successfully.

21. The method of claim 18, further comprising receiving another DCI on another data channel indicating a search space for initiating another scheduling chain after transmitting the HARQ indication.

22. The method of claim 21, further comprising receiving signaling in the search space scheduling a data channel for the other scheduling chain.

23. A base station, comprising:
a processing system configured to determine, for at least a first scheduling chain, a limit associated with a plurality of data channels that contain downlink control information (DCI), wherein the DCI contained in at least one of the plurality of data channels schedules another one of the plurality of data channels that contain DCI; and
a transmitter configured to transmit the DCI in the plurality of data channels to a user-equipment (UE), in accordance with the limit.

24. The base station of claim 23, wherein the transmitter is further configured to transmit, to the UE in a control resource set (CORESET), DCI scheduling one of the data channels containing an initial DCI of the first scheduling chain, and wherein determining the limit comprises determining that a final DCI in the first scheduling chain schedules another data channel that is in a slot prior to a following CORESET.

25. The base station of claim 23, wherein the transmitter is further configured to transmit, to the UE in a control resource set (CORESET), DCI scheduling one of the plurality of data channels containing an initial DCI of the first scheduling chain, and wherein determining the limit comprises determining that a final DCI in the first scheduling chain is in a slot prior to a following CORESET, the final DCI scheduling another data channel to be transmitted.

26. A user-equipment (UE), comprising:
a processing system configured to determine, for at least a first scheduling chain, a limit associated with a plurality of data channels that contain downlink control information (DCI), wherein the DCI contained in at least one of the plurality of data channels schedules another one of the plurality of data channels that contain DCI; and
a receiver configured to receive, from a base station, the DCI in the plurality of data channels in accordance with the limit.

27. The UE of claim 26, wherein the receiver is further configured to receive, in a control resource set (CORESET), DCI scheduling one of the data channels containing an initial DCI of the first scheduling chain, and wherein determining the limit comprises determining that a final DCI in the first scheduling chain schedules another data channel that is in a slot prior to a following CORESET.

28. The UE of claim 26, wherein the receiver is further configured to receive in a control resource set (CORESET), DCI scheduling one of the plurality of data channels containing an initial DCI of the first scheduling chain, and wherein determining the limit comprises determining that a final DCI in the first scheduling chain is in a slot prior to a following CORESET, the final DCI scheduling another data channel to be transmitted.

* * * * *